United States Patent [19]

DeWeese et al.

[11] 4,047,668
[45] Sept. 13, 1977

[54] WATER HYDRANT DIFFUSER

[76] Inventors: Harry R. DeWeese, 1785 Genevieve, San Bernardino, Calif. 92405; Gary L. Smith, 357 Terrace, San Bernardino, Calif. 92410

[21] Appl. No.: 663,057

[22] Filed: Mar. 2, 1976

[51] Int. Cl.² .................... G01F 1/36; B05B 1/26
[52] U.S. Cl. .................... 239/500; 73/212; 239/504; 239/505; 239/524
[58] Field of Search ........... 239/499, 500, 504, 505, 239/507, 512, 513, 514, 515, 518, 524; 116/117 R; 73/212

[56] References Cited

U.S. PATENT DOCUMENTS

| | | | |
|---|---|---|---|
| 1,041,470 | 10/1912 | Hiller | 73/212 |
| 1,751,345 | 3/1930 | Matsui | 239/504 X |
| 2,565,310 | 8/1951 | Jones | 73/212 |
| 2,915,252 | 12/1959 | Umbricht et al. | 239/500 |
| 3,037,710 | 6/1962 | Kusznier | 239/504 |
| 3,061,204 | 10/1962 | MacInnes et al. | 239/524 X |

Primary Examiner—Evon C. Blunk
Assistant Examiner—Andres Kashnikow
Attorney, Agent, or Firm—Harvey S. Hertz

[57] ABSTRACT

A water hydrant diffuser formed of a plurality of diffuser elements mounted in generally parallel planes in a housing. A coupling section has a free end and a mating end with the free end being designed so that the coupling section can be secured to a water hydrant outlet. The other end of the coupling section is connected to one end of the housing. A fluid flow measuring device can be inserted in the water hydrant diffuser intermediate the coupling section free end and the diffuser elements.

4 Claims, 2 Drawing Figures

U.S. Patent Sept. 13, 1977 4,047,668
FIG. 1.
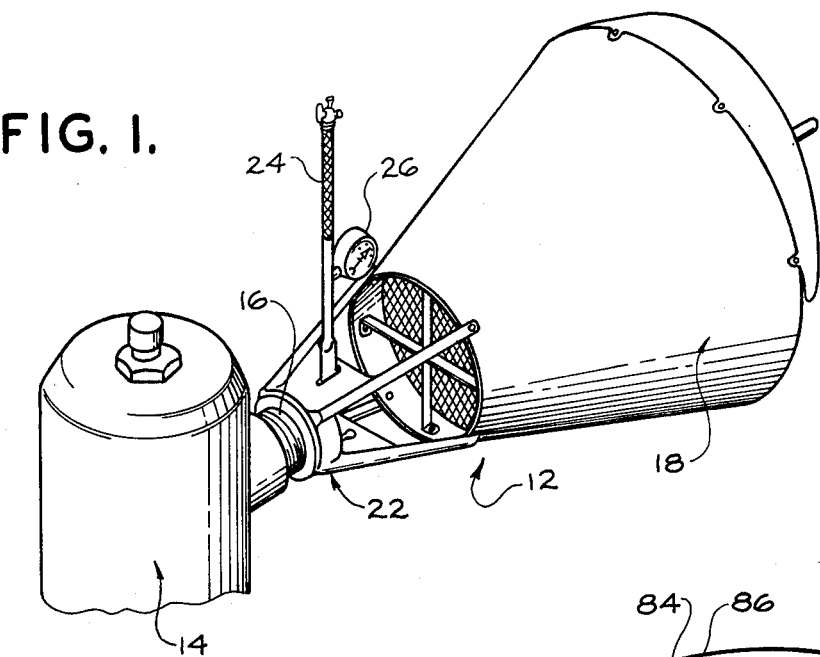
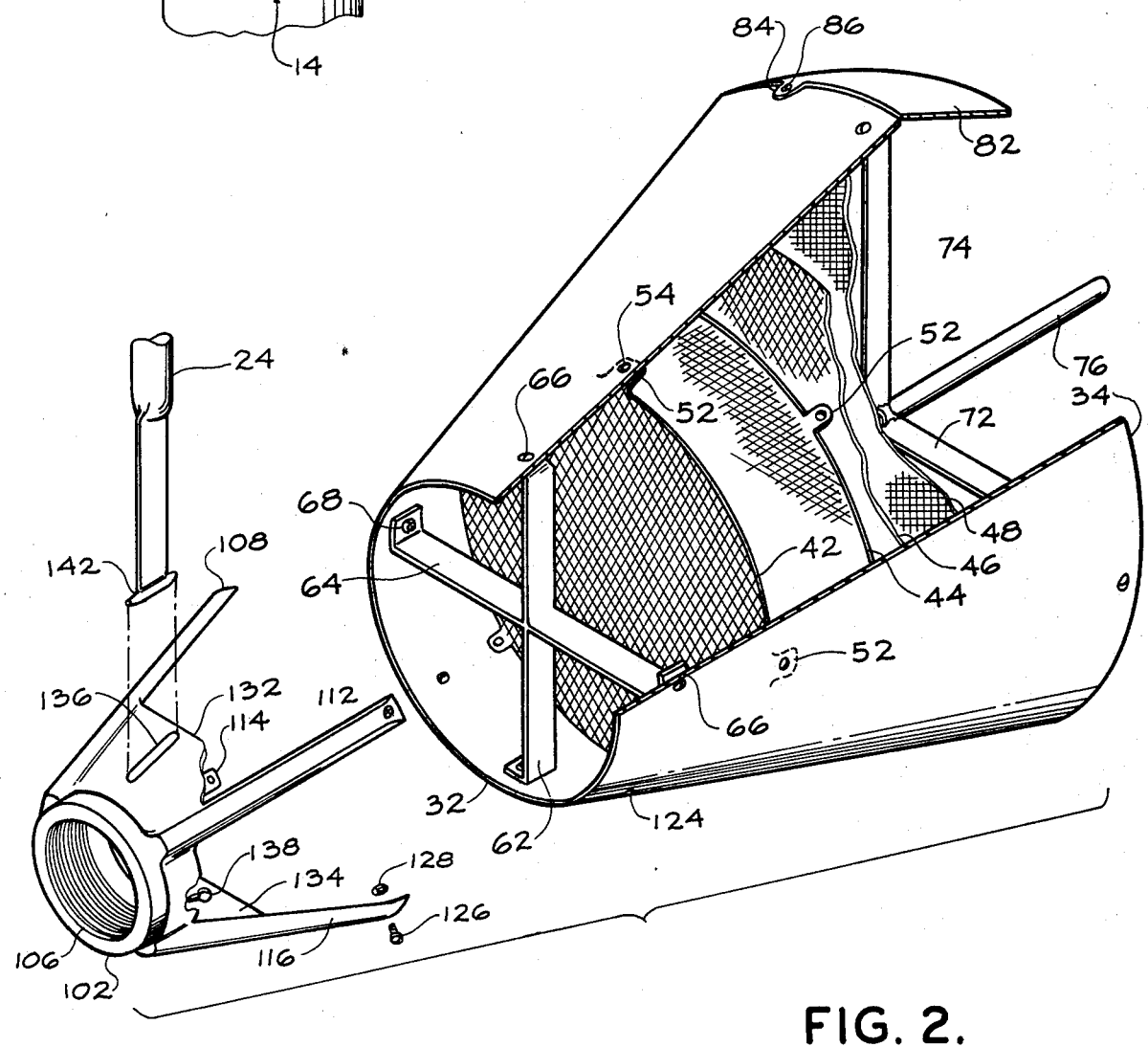
FIG. 2.

4,047,668

WATER HYDRANT DIFFUSER

BACKGROUND OF THE INVENTION

1. Field of the Invention

The field of art to which the invention pertains includes the field of water hydrant diffusers particularly with respect to a diffuser which can be connected to a water hydrant when the fluid flow from the hydrant is being measured.

2. Description of the Prior Art

Fire departments find it necessary to periodically measure the fluid flow from a water hydrant so as to ascertain that the water pressure is at a predetermined minimum amount required to fight fires. Typically a measuring device is connected to the hydrant outlet and the water turned on so that the pressure at the hydrant can be measured. During this procedure, it has been found that the water flow can cause damage to objects such as vehicles or to the surrounding landscape or housing adjacent the hydrant.

Known prior art includes U.S. Pat. Nos. 1,751,345; 2,915,252; 1,280,439; 2,742,324; 654,132; 1,337,589; and 3,465,968.

The present invention provides a water hydrant diffuser which can be easily coupled to a fire hydrant. As the water exits the hydrant, a measuring instrument can be inserted into the diffuser so as to measure the fluid flow from the hydrant. Once the water passes the measuring device, the diffuser elements act to disburse the fluid flow, so that the force of the water exiting the diffuser is greatly reduced.

SUMMARY OF THE INVENTION

The water hydrant diffuser having a plurality of diffuser elements mounted in generally parallel planes in a housing. A coupling section includes a free end and a mating end, with the free end being designed so as to enable the coupling section to be secured to a water hydrant outlet. The mating end is secured to one end of the housing. A fluid flow measuring device can be inserted into the diffuser intermediate the coupling section free end and the diffuser elements for measuring the flow of water from the hydrant.

The advantages of this invention, both as to its construction and mode of operation, will be readily appreciated as the same becomes better understood by reference to the following detailed description when considered in connection with the accompanying drawings in which like reference numerals designate like parts throughout the Figures.

BRIEF DESCRIPTION OF THE DRAWINGS

FIG. 1 is a perspective view of the water hydrant diffuser constructed in accordance with the principles of the invention; and FIG. 2 is an exploded perspective view, partially broken away, of the water hydrant diffuser of FIG. 1.

DESCRIPTION OF THE PREFERRED EMBODIMENTS

Referring now to FIG. 1 there is illustrated a water hydrant diffuser 12 constructed in accordance with the principles of the invention. The water hydrant diffuser 12 is illustrated being connected to a conventional hydrant 14 at its male outlet 16. Typically, in fighting fires a fire hose (not shown) is connected to the male outlet 16. The water hydrant diffuser 12 of the present invention is utilized during testing procedures to measure the fluid flow from the hydrant and effectively disburse the water at the outlet of the diffuser so as to prevent any damage therefrom.

The water hydrant diffuser 12 consists of a diffuser housing 18 and a coupling section 22. The coupling section 22 is used to connect the diffuser housing 18 to the hydrant male outlet 16. Additionally, the coupling section 22 contains an opening into which a fluid flow measuring device 24 can be inserted so as to measure the velocity of the water exiting the hydrant 14 at the male outlet 16 prior to the water entering the diffuser housing 18. The fluid flow measuring device 24 normally comprises a conventional Pitot tube to measure the water differential pressure which is a function of the velocity of the fluid flow and can be read on a conventional gauge 26. Typically, the gauge provides an output reading in pounds per square inch (p.s.i.) which in turn is converted to a flow rate of gallons per minute (g.p.m.).

Referring now to FIG. 2 the water hydrant diffuser 12 is shown in greater detail. The diffuser housing 18 is formed of a truncated cone having a reduced diameter base end 32 and an enlarged diameter base end 34. Four screens 42, 44, 46 and 48 are spaced in the housing intermediate the reduced diameter base end 32 toward the enlarged diameter base end 34 in planes perpendicular to the axis of the diffuser housing 18. Each of the screens have a diameter approximately equal to the inner diameter of the diffuser housing 18 in the plane in which they are positioned. The first screen 42 is spaced from the reduced diameter base end 32 and contains a plurality of mounting flanges 52 which are bent at an angle so that they extend from the perimeter of the screen at an angle and in a plane parallel to the adjacent portion of the diffuser housing 18. Screws 43 or a nut and bolt are used to secure the flanges 52 to the diffuser housing 18. Similarly the spaced screens 44, 46 and 48 are also mounted to the diffuser housing 18 by means of flanges 52.

A pair of integrally formed right angle cross bars 62 and 64 are symmetrically positioned adjacent the reduced diameter base end 32 directly in front of the first diffuser screen 42 and in a plane parallel thereto. The ends of the cross bars 62 and 64 contain curved end flanges 66 which are positioned flush with the interior of the diffuser housing 18 enabling the cross bars to be securely fastened thereto by means of a bolt 66 and nut 68. Similarly, a pair of crossbars 72 and 74 are positioned adjacent the enlarged diameter base end 34 of the diffuser housing 18.

A carrying handle 76 formed of a cylindrical bar extends parallel to the axis of the diffuser housing 18 and is secured to the junction of the cross bars 72 and 74. The handle 76 extends to the exterior of the enlarged diameter base end 34, enabling the water hydrant diffuser 12 to be transported.

A deflector 82 is attached to the diffuser housing 18 at the enlarged diameter base end 34. The deflector forms an obtuse angle with the diffuser housing 18 and typically contains mounting flanges 84 which can be secured to the surface of the diffuser housing by means of sheet metal screws 86 or a conventional nut and bolt arrangement. The deflector 82 is normally formed of an arc section extending from a portion of the diffuser housing 18 and deflects water in a direction dependent upon the relative rotational position of the diffuser. Typically, as will be explained hereinafter, the handle 76 is used to rotate the water hydrant diffuser 12 so that the water will be deflected away from objects which are to be protected from the water flow.

The coupling section 16 is formed of a cylindrical female coupling ring 102 having a threaded interior 104 enabling the coupling ring front end 106 to be threaded onto the hydrant male outlet 16. A plurality of integrally formed arms 108, 112, 114 and 116 are spaced ninety degrees apart on the exterior surface of the coupling ring 102. The arms flare rearwardly from the rear of the coupling ring 102 at an angle approximately equal to the flare of the truncated cone diffuser housing 18. The ends 118 of each of the arms 108, 112, 114 and 116 contain openings 122 enabling the arms to be secured to the diffuser housing 18 exterior surface adjacent the reduced diameter base end 32. Openings 124 in the diffuser housing enable a nut 126 and a bolt 128 to be used to secure the free ends of the arms to the diffuser housing 18.

A pair of integrally formed opposed webs 132 and 134 interconnect the arms 108 and 112, and the arms 114 and 116, respectively, adjacent the female coupling ring. The webs are formed of flat metal and each contain a different sized aperture. The aperture 136 is formed of an elongated slot extending generally parallel to the axis of the coupling ring 102. Similarly a key shaped aperture 138 is formed in the web 134. The slotted aperture 136 enables the end 142 of the fluid flow measurement device to be inserted directly in the center of the flow of water from the hydrant male outlet 16 when measuring tests are performed. The key aperture 138 is utilized with a different type of fluid flow measurement device (not shown). It should be understood, of course, that additional webs could be connected such as between the arms 112 and 116 enabling a third type of device to be inserted adjacent the female coupling ring 102 center.

In operation, the water hydrant diffuser 12 is secured by means of the female coupling ring 102 to the hydrant male outlet 16. Rotation should be sufficient to secure the female coupling ring 102 to the hydrant male outlet but some free rotation is permissable so that the deflector 82 is positioned for the correct diversion of water from the enlarged diameter base end 34. The fluid flow measurement device is inserted through the slot 136 and the hydrant 14 is actuated enabling water to flow therefrom and the velocity thereof measured.

The water initially strikes the cross bars 62 and 64 which break the flow force of the water before it hits the screen elements 42, 44, 46 and 48. In addition, should rocks or other debris be present in the water mains, the cross bars 62 and 64 are of much stronger stock than the screen elements and can resist the impact therefrom more easily. The screens 42, 44, 46 and 48 break up the water so that the force is substantially reduced when exiting the enlarged diameter base end 34 of the diffuser housing 10. However, the screen elements are of sufficient size so that no back pressure is created therefrom. The cross bars 72 and 74 adjacent the enlarged diameter base end 34 are used to both form a mounting for the handle 76 as well as to retain the shape of the diffuser housing 18. Additionally, the cross bars are mounted so that they are juxtaposed with the fourth screen 48 which is of larger diameter than the other three screens and can lend support thereto.

Typically the coupling ring 102 is a two and one-half inch diameter female threaded coupler ring which will fit the standard 2½ inch outlet fire hydrant. Of course, other sized coupling rings could be made as well. For the 2½ inch hydrant outlet, it has been found that a diffuser housing having an altitude of 13¾ inches and an eight inch diameter reduced base end 32 and a seventeen inch diameter base end 34 is satisfactory for four screen elements spaced therein. The diffuser housing 18 and deflector 82 are normally made of 26 gage galvinized metal. The first screen 42 adjacent the reduced diameter base end 32 was made of ¾ inch thirteen gage standard cold rolled steel expanded. The remaining screen elements have been found to be satisfactory using ½ inch 16 gage standard cold rolled steel expanded. Either bolts, rivets or similar devices can be utilized to hold the screens in place to withstand the impact of a flow of water of 1600 gallons per minute. The cross bars 62, 64 and 72, 74 are typically formed of flat stock steel. The coupling section 22 can be cast as a single unit using aluminum alloy.

We claim:

1. A water hydrant diffuser comprising:
   a plurality of diffuser elements mounted in an enclosed housing in generally parallel planes;
   a coupling section having a free end and a mating end, said free end having threaded female coupling means for securing said coupling section to a water hydrant outlet and said mating end being secured to one end of said housing, said housing being formed of a truncated cone having a small diameter base and an enlarged diameter base with said small diameter base being connected to said coupling section, said enlarged diameter base end containing a handle for carrying said diffuser, said handle being secured to a pair of housing shape retention cross bars secured to said truncated cone; and
   aperture means for inserting a fluid flow measuring device in said diffuser intermediate said coupling member free end and said diffuser elements.

2. A water hydrant diffuser in accordance with claim 1 wherein said diffuser elements being positioned in said housing intermediate said ends and being formed of metal screens.

3. A water hydrant diffuser in accordance with claim 2 wherein a plurality of metal cross bars are mounted and secured to said housing adjacent said reduced first end in a plane parallel to said diffuser elements for breaking the flow of waer prior to the water striking said screen members and for deflecting debris.

4. A water hydrant diffuser in accordance with claim 3 wherein a deflector is positioned adjacent said enlarged diameter end of said housing and secured thereto for diverting water exiting said housing in a desired direction.

* * * * *